United States Patent Office 3,734,965

Patented May 22, 1973

3,734,965

N-ALKYLENE-OXY-ALKYLENEAMINES OF HYDROXYBENZYLAMINES

Wilhelm Becker, Hamburg, Germany, assignor to Reichhold-Albert-Chemie Aktiengesellschaft, Hamburg, Germany No Drawing. Filed Nov. 3, 1969, Ser. No. 873,620
Claims priority, application Switzerland, Nov. 13, 1968, 17,157/68
Int. Cl. C07c 87/28
U.S. Cl. 260—570.5 P 5 Claims

ABSTRACT OF THE DISCLOSURE

A phenolic resin having a polyoxypropyleneamine substituent wherein the resin has the general formula:

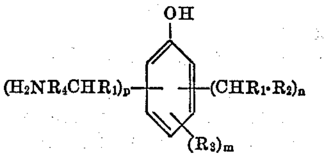

wherein $R_1$=H—, $CH_3$—, $C_2H_5$—, $C_3H_7$—, $C_4H_9$— or

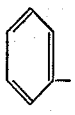

$R_2$=

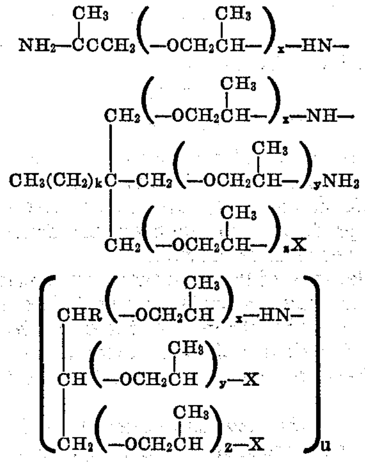

or

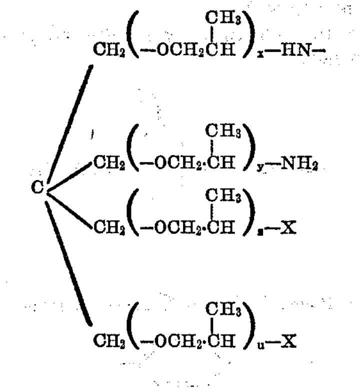

$R_3$=

H—, $CH_3$—, $(CH_3)_3C$—, HO—,

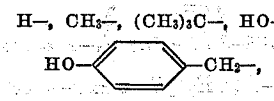

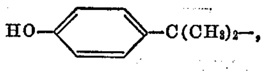

or

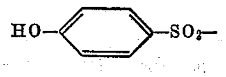

$R_4$=

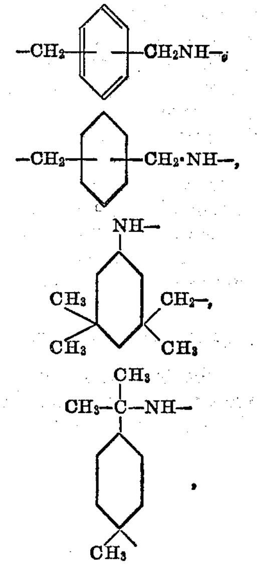

—$(CH_2)_3NH(CH_2)_3NH$—,
—$CH_2.C(CH_3)_2.CH_2.CH(CH_3).CH_2.CH\cdot.NH$—,
—$CH_2.CH(CH_3).CH_2.C(CH_3)_2.CH_2.CH_2.NH$—,
—$(CH_2)_2NH$—,
—$(CH_2)_3NH$—,
—$(CH_2)_4NH$—,
—$(CH_2)_5NH$—,
—$(CH_2)_6NH$—,
—$(CH_2CH_2NH)$—,
—$(CH_2CH_2NH)_2$—,
—$(CH_2CH_2NH)_3$—, or
—$(CH_2CH_2NH)_4$—;

R=—H or —$CH_3$;
X=—$NH_2$ or —OH;
$n$ and $m$=integers from 1 to 3;
$x$, $y$ and $z$=1 to 50;
$k$ and $u$=0 to 4; and
$p$=0 or an integer from 1 to 2

CROSS REFERENCES TO RELATED APPLICATIONS

Applicant claims priority under 35 U.S.C. 119 for application Ser. No. 17,157/68 filed Nov. 13, 1968 in the Patent Office of Switzerland.

The disclosure of applicant's copending application entitled "Epoxide Resin Compositions," filed in the U.S. Patent Office on the same day as the present application is incorporated herein.

BACKGROUND OF THE INVENTION

The field of the invention is phenolic resins and the present invention is particularly concerned with substituted phenols formed by condensing polyoxypropyleneamine with phenol and aldehyde.

U.S. Pat. 3,236,895 of Lee and Winfrey which issued Feb. 22, 1966, discloses the prior art "Polyoxyalkylenepolyamines." The patent discloses the preparation and use of polyoxyalkylenediamines as curing agents in epoxide resin compositions. The general formula for the disclosed polyoxyalkylenediamines has the following form:

$$H(HNC_nH_{2n})_yNH—C_3H_6(OC_3H_6)_a—NH(C_nH_{2n}NH)_yH$$

wherein $a$=an integer providing a MW of at least 249;
$n$=2 to 4; and
$y$=0 to 3.

Kirk-Othmer "Encyclopedia of Chemical Technology," 2d Edition, discloses the state of the art of phenolic resins in vol. 15 (1968), pp. 176–208, particularly p. 181, where the production of phenolic triamines is disclosed and the state of the art of epoxides and epoxy resins in vol. 8 (1966), pp. 263–312, particularly p. 304, where the catalytic polymerization of epoxy groups is disclosed as being carried out by tertiary amines.

The use of the prior art polyoxypropyleneamines as curing agents for epoxide resins prevents brittleness in the cured product. These polyetheramines however suffer from the disadvantage of very long curing times at room temperature when used in curing polyepoxides. At temperatures around 0° C. virtually no curing takes place and at high humidities a cloudy tacky surface called "blue flush" results.

SUMMARY OF THE INVENTION

Having in mind the limitations of the prior art polyoxypropyleneamines as curing agents for epoxide resins, it is an object of the present invention to provide curing agents which have the advantages of the polyoxypropyleneamines without the limitations.

The substituted phenols of the present invention have particular utility as curing agents for epoxide resins.

According to the present invention, substituted phenols are produced by condensing a polyoxypropyleneamine with a phenol and an aldehyde.

Preferably the polyoxypropyleneamine has a formula as follows: as disclosed in "Advance Technical Data" from Jefferson Chemical Company, Inc., March 1968 and October 1967,

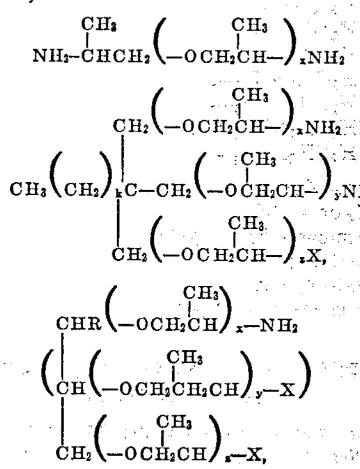

or

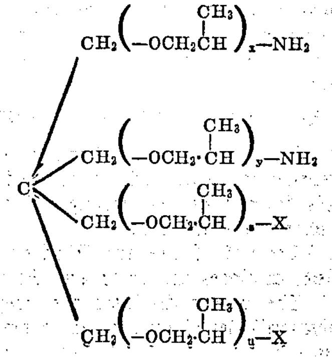

wherein

R=H or $—CH_3$;
X=$NH_2$ or —OH;
$x$, $y$ and $z$=1 to 50; and
$k$ and $u$=0 to 4.

Preferred phenols for use in the present invention are those having the general formula:

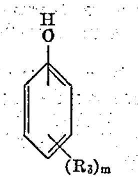

in which $R_3$=H—, $CH_3$, $(CH_3)_3C$—, HO— or

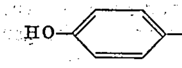

$m$=an integer from 1 to 3 and
B=$—CH_2—$, $—C(CH_3)_2—$ or $—SO_2—$.

Examples of suitable monohydric or polyhydric phenols having at least one aldehyde reactive nuclear position for use as starting compounds for the manufacture of the novel substituted phenols are for example, phenol, o-, m- and p-cresol, xylenols, resorcinol, pyrocatechol, hydroquinone, phloroglucinol, pyrogallol, α- and β-naphthol, p-tert.-butylphenol, 4,4′-dihydroxydiphenylmethane, 4,4′-dihydroxydiphenylether, 4,4′-dihydroxydiphenylsulphone and others.

As aldehydes, both those of aliphatic nature and also those of aromatic nature, such as for example formaldehyde, acetaldehyde, butyraldehyde, and benzaldehyde, are employed. The preferred aldehydes are those having the general formula RHCO in which R=H, $CH_3$—, $C_2H_5$—, $C_3H_7$—, $C_4H_9$— or

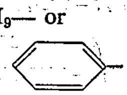

The molar ratios of the individual components polyoxypropyleneamine aldehyde and phenol can be varied within wide limits during the manufacture of the condensation products, depending on the desired viscosity and properties of these products.

The molar ratio of the components when manufacturing the new substituted phenols may be 1:1 to 1:3, preferably 1:1 to 1:1.2 for the monohydric or polyhydric phenol to the poly-functional polyoxypropyleneamines. The molar ratio of phenol to aldehyde may be 1:1 to 1:3, preferably 1:1 to 1:1.2.

The use of the new substituted phenols for curing epoxide resins is the subject of our copending U.S. patent application entitled "Epoxide Resin Compositions," filed of even date herewith.

The invention includes the substituted phenols of the general formula:

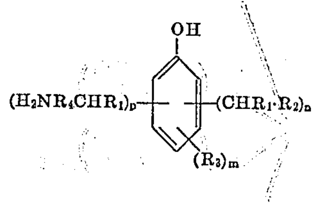

wherein $R_1$=H—, $CH_3$—, $C_2H_5$—, $C_3H_7$—, $C_4H_9$— or

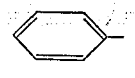

$R_2$=NH—(CH(CH$_3$)—CH$_2$O)$_x$—A, x=1 to 50

$R_3$=H—, $CH_3$—, $(CH_3)_3C$—, HO—, or

$B=—CH_2—$, $—C(CH_3)_2—$ or $—SO_2—$,
$n$=integers from 1 to 3, and
$m$=integers from 1 to 3, and wherein A represents the following radicals:

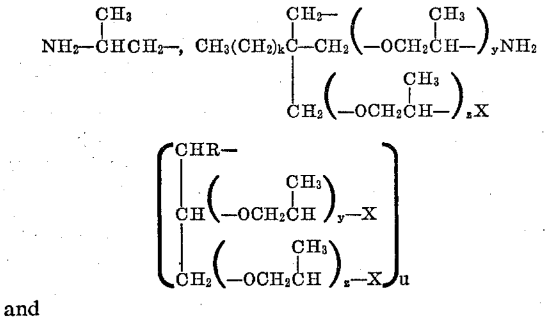

and

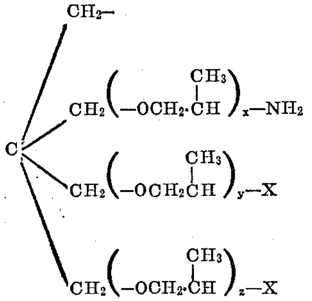

wherein
R=H or $—CH_3$,
$x$, $y$ and $z$=1 to 50,
$k$ and $u$=0 to 4,
$X=NH_2$ or —OH and
$p$=0 or an integer from 1 to 2

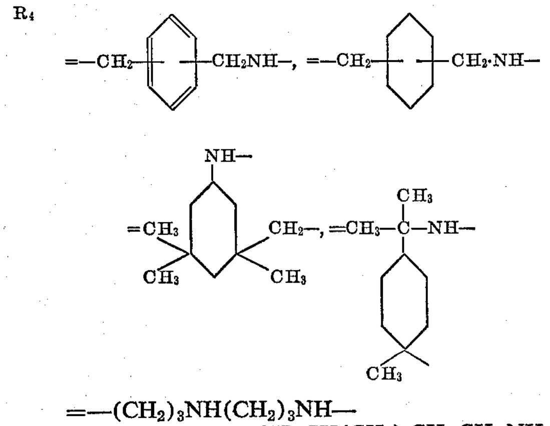

$=—(CH_2)_3NH(CH_2)_3NH—$
$=—CH_2.C(CH_3)_2.CH_2.CH(CH_3).CH_2.CH_2.NH—$
$=—CH_2.CH(CH_3).CH_2.C(CH_3)_2.CH_2.CH_2.NH—$
$=—(CH_2)_qNH—$, $q$= an integer from 2 to 6 and
$=—(CH_2.CH_2.NH)_r—$, $r$=an integer from 1 to 4

DESCRIPTION OF THE PREFERRED EMBODIMENTS

To the extent that the novel substituted phenols are intended for use as curing agents or curing agent components for the reaction of epoxide compounds to form plastics which are insoluble in organic media, it is advantageous to add subsequently free phenol or phenols such as those previously mentioned and/or free polyoxypropyleneamines and/or aldehyde to the substituted phenols.

If a subsequent addition of phenols and/or polyoxypropyleneamines and/or aldehydes is undesirable, the reaction mix can be treated with excess phenols and/or excess polyoxypropyleneamines and/or aldehydes. In such cases the molar ratio of monohydric or polyhydric phenol to the polyfunctional polyoxypropyleneamines is 0.01:1 to 5:1, preferably 0.1:1 to 2:1, and the molar ratio of phenol or phenols to aldehyde is between 1:0.1 and 1:3, preferably 1:0.5 to 1:1.2, with the reacted constituents acting as modifying additives to the reaction product for use as curing agents.

The substituted phenols of the present invention are manufactured by condensation of polyoxypropyleneamines, at least monoreactive phenols and aldehydes, and heating of these mixtures to temperatures of, for example 100 to 150° C. After completion of the condensation reaction the resulting water of reaction is distilled off, whereupon the condensation products remain as oily to resinous masses. The preferred procedure used is to mix the polyoxypropyleneamine or its mixtures and the phenol component in a reaction vessel and warm to 90–100° C., preferably 30 to 50° C. In these temperature ranges the aldehyde (for example formaldehyde in an aqueous 30 to 45% strength by weight solution, or as polymeric paraformaldehyde) is added over a period of 30 to 300 minutes, with cooling where appropriate if the reaction is too strongly exothermic. When the reaction has subsided, water is then removed from the reaction mixture, preferably under a vacuum of 15 to 60 mm. Hg, with the temperature being raised to 150° C., preferably 100° C. It is, however, also possible to introduce the phenol or phenols and formaldehyde initially and to add polyoxypropyleneamine at 20 to 100° C., preferably 30 to 50° C. optionally with cooling; on the other hand, however, it is also possible to work by only initially introducing the polyoxypropylene amine and first to add aldehyde while cooling to 20–100° C., preferably 30–50° C., and subsequently adding phenol or phenols. The mixture is thereafter worked up. After filtration and cooling light yellow to dark yellow condensation products are obtained which, in accordance with their "active hydrogen equivalent" can be reacted with epoxide resins to give plastics which are insoluble in organic solvents. The "active hydrogen equivalent" is obtained from the yield of substituted phenol divided by the equivalents of nitrogen-bound hydrogen present in the reaction mix, minus the amount consumed by the reaction with the aldehyde.

To the extent that the new substituted phenols are to be used as curing agents for epoxide compounds, it can be advantageous to mix these with other substituted phenols, which have been obtained in the same manner but in the case of which other polyfunctional amines have been employed in the condensation instead of the polyoxypropyleneamines. In order to avoid such a subsequent mixing, it is also possible to manufacture the new substituted phenols in the presence of additional other polyfunctional amines.

In the manufacture of the substituted phenols of the present invention, suitable amines for mixing with the polyoxpropyleneamines which are to be reacted and which have already been mentioned are, for example, aliphatic, saturated or unsaturated, bifunctional amines, such as, for example, lower aliphatic alkylene-polyamines, such as, for example, ethylenediamine, 1,2-propylenediamine, 1,3-propylenediamine, 1,4-butylenediamine, hexamethylenediamine or polyalkylenepolyamines, or for example, homologous polyethylene-polyamines, such as diethylenetriamine, triethylenetetramine, or analogous polypropylene-polyamines such as, for example, dipropylenetriamine. In addition, other aliphatic, cycloaliphatic or araliphatic amines having at least two amine hydrogen functions are directly suitable for mixing for reaction purposes, such as for example, β,β-diamino-di-n-propylamine, cycloaliphatic amines such as xylylenediamine, 3,5,5-trimethyl-3-aminomethyl-cyclohexylamine, menthanediamine, 2,2,4-(2,4,4)-trimethyl-hexamethylenediamine, cyclohexane-bis-methylamine and cyclohexane-diamine.

The mixing with the other amines mentioned prior to the reaction has the advantage that the amines accelerate the reaction when the polyoxypropyleneamines provided for the manufacture of the new substituted phenols are slow to react in the reaction because of their higher molecular weight.

The new phenols of the present invention or the mixtures already mentioned which contain these are used as curing agents for the manufacture of mouldings and coatings from epoxide compounds.

From the large number of epoxide compounds which contain more than one 1,2-epoxide group in the molecule, and which can be reacted with the substituted phenols to give mouldings and coatings there may be mentioned:

The epoxides of multiple-unsaturated hydrocarbons, (vinylcyclohexene, dicyclopentadiene, cyclohexanediane, cyclododecadiene, cyclododecatriene, isoprene, 1,5-hexadiene, butadiene, polybutadienes, divinylbenzenes and the like), oligomers of epichlorohydrin and the like, epoxy-ethers of polyhydric alcohols (ethylene, propylene and butylene glycols, polyglycols, thiodiglycols, glycerine, pentaerythritol, sorbitol, polyvinyl alcohol, polyallyl alcohol and the like), epoxy-ethers of polyhydric phenols (resorcinol, hydroquinone, bis-(4-hydroxyphenyl)-methane,
bis-(4-hydroxy-3-methylphenyl)-methane,
bis-(4-hydroxy-3,5-dichlorophenyl)-methane,
bis-(4-hydroxy-3,5-dibromophenyl)-methane,
bis-(4-difluorophenyl)-methane,
1,1-bis(4-hydroxyphenyl)-ethane,
2,2-bis-(4-hydroxyphenyl)-propane,
2,2-bis-(4-hydroxy-3-methylphenyl)-propane,
2,2-bis-(4-hydroxy-3-chlorophenyl)-propane,
2,2-bis-(4-hydroxy-3,5-dichlorophenyl)-propane,
bis(4-hydroxyphenyl)-phenylmethane,
bis-(4-hydroxyphenyl)-diphenylmethane,
bis-(4-hydroxyphenyl)-4′-methylphenylmethane,
1,1-bis-(4-hydroxyphenyl)-2,2,2-trichloroethane,
bis-(4-hydroxyphenyl)-(4-chlorophenyl)-methane,
1,1-bis-(4-hydroxyphenyl)-cyclohexane,
bis-(4-hydroxyphenyl)-cyclohexylmethane,
4,4′-dihydroxydiphenyl,
2,2′-dihydroxydiphenyl,
4,4′-dihydroxydiphenylsulphone as well as their hydroxyethyl-ethers, phenol-formaldehyde condensation products such as phenol-alcohols, phenol-aldehyde resins and the like), epoxides containing S and N (N,N-diglycidylaniline, N,N′-dimethyldiglycidyl-4,4-diamino-diphenylmethane) as well as epoxides which have been manufactured according to usual processes from multiple-unsaturated carboxylic acids or singly unsaturated carboxylic acid esters of unsaturated alcohols, glycidyl esters, polyglycidyl esters, which can be obtained by polymerization or copolymerization of glycidyl esters of unsaturated acids or which are obtainable from other acid compounds (cyanuric acid, diglycidyl sulphide, cyclic trimethylene-trisulphone or their derivatives, and others).

In this application it is possible to react, just as well as the above-mentioned pure epoxides, their mixtures and also mixtures with monoepoxides, optionally in the presence of solvents or plasticizers. Thus, for example, the following monoepoxides are used mixed with the above-mentioned epoxide compounds: epoxidized singly unsaturated hydrocarbons (butylene, cyclohexene, or styrene oxide and others) halogen-containing epoxides such as, for example, epichlorohydrin, epoxy-ethers of monohydric alcohols (methyl, ethyl, butyl, 2-ethylhexyl or dodecyl alcohol and others), epoxy-ethers of monohydric phenols (phenol, cresol as well as other phenols which are substituted in the o-position or p-position), glycidyl esters of unsaturated carboxylic acids, epoxidized esters of unsaturated alcohols or unsaturated carboxylic acids, as well as the acetals of glycidaldehyde.

Fillers, dyestuffs, pigments, solvents or plasticizers as well as cure accelerators are added before curing to the epoxide compounds mentioned which are reacted to give mouldings and coatings.

The use of the substituted phenols manufactured according to the invention for the manufacture of mouldings and coatings can optionally be speeded up by adding substances acting as accelerators from the group of monohydric or polyhydric phenols, especially aminophenols, o monohydric or polyhydric alcohols or also by means of compounds such as mercapto compounds, thioethers, dithioethers or compounds with nitrogen-carbon-sulphur groupings or sulphoxide groups.

In the application according to the invention, the cure of the epoxide resins or epoxide compounds which contain more than one epoxide group in the molecule with the substituted phenols obtained according to the invention can, depending on the reactivity of the epoxide resins or of the condensed-in polyoxypropylenamines, be effected at room temperature or also at significantly higher temperatures.

Usually a temperature range of 0 to 150° C. is used. Appropriately, these new substituted phenols are employed as curing agents in amounts which are equivalent to the epoxide resin, but in many cases an excess of up to 50 percent or a deficiency of up to 25 percent of the substituted phenols is possible without difficulty. The curing reaction is optionally accelerated or influenced by adding alcohols, carboxylic acids, epichlorohydrin, hydrogen halide and other accelerators, as well as by adding polyamidoamines. It should be emphasized that cure takes place with the new curing agents even at low temperatures down to about zero and under certain circumstances at −5° C. Curing is furthermore possible at high atmospheric humidity and in many cases even under water. The reactivity, elasticity and chemical resistance are suited to the particular end use by appropriate choice and amount of the components of the condensation products, namely amine, aldehyde and phenol.

When the new curing agents are used for the manufacture of coatings, good levelling and good pigmentability are in such cases achieved.

In the use of the substituted phenols according to the invention in epoxide compositions, cured epoxide resins are obtained which possess excellent resistance to water, acid and chemicals, good surface gloss and in part very good elasticity. They are very suitable for the manufacture of castings of large volume, for example, for tool construction. They are also used as laminating resins, adhesives and putties, as a synthetic resin cement and as a coating, lining and repair material for concrete floors and concrete pipes. In contrast to many conventional amine curing agents, the new substituted phenols which have been described are compatible, by themselves and also in combination with epoxide resins, with bitumen, asphalt and similar tar products. Such combinations with tar products are advantageously used in surface protection and corrosion protection, in road construction and in building. By way of example, there may be mentioned filling compositions and adhesives, sealing material and insulating material.

The mouldings or coatings obtained from the epoxide resins according to the present invention are provided, prior to cure, with fillers such as silicon dioxide, hydrated aluminum oxide, titanium dioxide, glass fibers, wood flour, mica, graphite, calcium silicate and/or sand, as well as the usual pigments with particle sizes of 0.5 to 5 mm.

Preferred examples of the polyoxypropylenamines of the present invention include polyoxypropylenediamine (average molecular weight abbreviated M.W. 190), polyoxypropylenediamine (M.W. 230), polyoxypropylenediamine (M.W. 240), polyoxypropylenediamine (M.W. 300), polyoxypropylenediamine (M.W. 400), polyoxypropylenediamine (M.W. 600), polyoxypropylenediamine (M.W. 700), polyoxypropylenediamine (M.W. 800), polyoxypropylenediamine (M.W. 1000), polyoxypropylenediamine (M.W. 1500), polyoxypropylenediamine (M.W. 2000), polyoxypropylenetriamine (M.W. 400), polyoxypropylenetriamine (M.W. 700), polyoxypropylenetriamine (M.W. 1000) or mixtures of the same.

Examples of the overall combination of the condensation reactants polyoxypropyleneamine/phenol/aldehyde include in molar ratios:

| Mole | Polyoxypropyleneamine | M.W. | Mole | Phenol | Mole | Aldehyde |
|---|---|---|---|---|---|---|
| 2 | Polyoxypropylenediamine. | 190 | 1 | Phenol | 1 | Formaldehyde. |
| 1 | do | 190 | 1 | do | 1 | Do. |
| 1 | do | 230 | 1 | do | 1 | Do. |
| 1 | do | 240 | 1 | do | 1 | Do. |
| 1 | do | 400 | 1 | do | 1 | Do. |
| 1.1 | do | 248 | 0.71 | do | 0.5 | Do. |
| 0.546 | do | 1,000 | 1 | do | 1 | Do. |
| 1 | do | 1,000 | 1 | do | 1 | Do. |
| 1 | do | 2,000 | 1 | do | 1 | Do. |
| 0.25 | do | 1,000 | 1 | do | 0.25 | Do. |
| 0.72 | do | 190 | 1.72 | do | 1.2 | Do. |
| 1 | do | 230 | 1 | Cresol | 1 | Do. |
| 1 | do | 240 | 1 | p-tert. butylphenol. | 1 | Do. |
| 1 | do | 190 | 1 | Phenol | 1 | Acetaldehyde. |
| 1 | do | 190 | 0.5 | do | 0.5 | Formaldehyde. |
| 1 | Polyoxypropylenetramine. | 400 | 1 | do | 1 | Do. |
| 1 | do | 400 | 0.5 | do | 0.5 | Do. |
| 1 | do | 700 | 1 | do | 1 | Do. |

Preferred examples of the overall combination of the condensation reactants polyoxypropyleneamine/phenol/aldehyde/polyfunctional amines include.

| Mole | Polyoxypropyleneamine | M.W. | Mole | Phenol | Mole | Aldehyde | Mole | Polyfunctional amines |
|---|---|---|---|---|---|---|---|---|
| 0.5 | Polyoxypropylenediamine | 190 | 1 | Phenol | 1 | Formaldehyde | 0.5 | Triethylene tetramine. |
| 0.5 | do | 190 | 1 | do | 1 | do | 0.5 | Xylylene diamine. |
| 0.5 | do | 230 | 1 | do | 1 | do | 0.5 | Diethylene triamine. |
| 0.5 | do | 240 | 1 | do | 1 | do | 0.5 | 1,4-bis-(aminomethyl)-cyclohexane. |
| 0.7 | do | 1,000 | 1 | do | 1 | do | 0.3 | Triethylene tetramine. |
| 0.7 | do | 2,000 | 1 | do | 1 | do | 0.3 | Diethylene triamine. |
| 0.5 | do | 240 | 1 | do | 1 | do | 0.5 | 3,5,5-trimethyl-3-aminomethyl-cyclohexylamine. |
| 0.7 | do | 400 | 1 | do | 1 | do | 0.3 | Menthanediamine. |
| 0.5 | do | 190 | 1 | do | 1 | do | 0.5 | β,β-Diamino-di-n-propylamine. |
| 0.7 | do | 1,000 | 1 | do | 1 | do | 0.3 | Xylylene diamine. |
| 0.5 | do | 2,000 | 1 | do | 1 | do | 0.5 | 1,4-bis-(aminomethyl)-cyclohexane. |
| 0.7 | Polyoxypropylenetriamine | 400 | 1 | do | 1 | do | 0.3 | Triethylene tetramine. |
| 0.5 | do | 700 | 1 | do | 1 | do | 0.5 | Xylylene diamine. |
| 0.5 | do | 400 | 1 | do | 1 | do | 0.5 | Diethylene triamine. |

The following data and examples explain the manufacture of the new condensation products and their use as curing agents for the manufacture of mouldings and coatings.

EXAMPLE 1

380 g. of polyoxypropylenediamine (molecular weight=190, 2 moles) were warmed to 40° C. and mixed over the course of 45 minutes with 69 g. of a 44% strength by weight formaldehyde solution (1 mole) while cooling. After a further 30 minutes, 94 g. of phenol liquefied by warming (1 mole) were added. After 30 minutes stirring water was distilled off under a water pump vacuum of about 20 mm. Hg and with slow heating up to 100° C. At 100° C. the reaction product was left for a further 30 minutes under the water pump vacuum. A low viscosity reaction product is obtained, having a viscosity of 71 cp. (25° C.), a density of 0.983 (25° C.), a hydrogen equivalent weight (subsequently abbreviated H.A.V.) of 69.5 and a Gardner color number of 4 to 5. The pot life was 137 minutes at 22° C. The condensation product 1 mainly consists of the compound

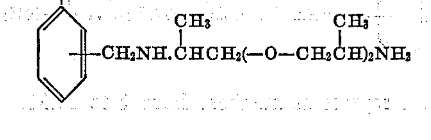

EXAMPLE 2

273 g. of polyoxypropylenediamine (molecular weight=248, 1.1 moles) and 66.5 g. of phenol (0.71 mole) were warmed to 40° C. 34 g. of a 44 percent strength by weight aqueous formaldehyde solution (0.5 mole) were added over the course of 30 minutes. After 30 minutes stirring water was distilled off under a water pump vacuum of about 20 mm. Hg and while slowly heating up to 100° C. At 100° C. the reaction product was left for a further 30 minutes under the water pump vacuum. A low viscosity reaction product is obtained having a viscosity of 78 cp. (25° C.), a density of 0.991 (25° C.), an H.A.V. of 88.5 and a Gardner color number of 5. The pot life was 128 minutes at 22° C.

The condensation product 2 mainly consists of

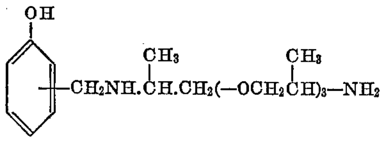

EXAMPLE 3

A procedure corresponding to that described for the manufacture of the condensation product 2 is followed. However, 398 g. of polyoxypropylenediamine (molecular weight 398, 1 mole), 34 g. of 44 percent strength by weight aqueous formaldehyde solution (0.5 mole) and 100 g. of phenol (1.06 moles) are employed.

The curing agent has an H.A.V. of 144, a viscosity, measured in the Höppler viscometer at 25° C., of 151 cp. and a pot life (100 g. of a polyglycidyl ether based on bisphenol A and epichlorhydrin, with an epoxide equivalent weight of 190, mixed with 76 g. of the curing agent) of 144 minutes measured at 22° C.

The condensation product 3 mainly consists of

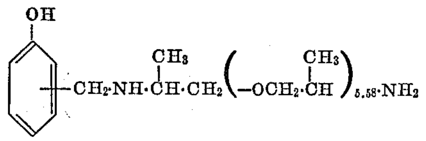

EXAMPLE 4

A procedure corresponding to that described for the manufacture of the condensation product 1 is followed. However, 146 g. of triethylene tetramine (1 mole), 146 g. of polyoxypropylenediamine (molecular weight 1000, 0.146 mole), 94 g. of phenol (1 mole) and 68.5 g. of a 44 percent strength by weight aqueous formaldehyde solution (1 mole) are employed.

The curing agent has an H.A.V. of 89.5, a viscosity of 455 cp. measured in the Höppler viscometer at 25° C., a density of 1.03 (25° C.), an amine number of 441 and a pot life (100 g. of a polyglycidyl ether based on bisphenol A and epichlorhydrin with an epoxide equivalent of 190, mixed with 47 g. of the curing agent) of 17 minutes measured at 22° C.

The condensation product 4 consists of a mixture of

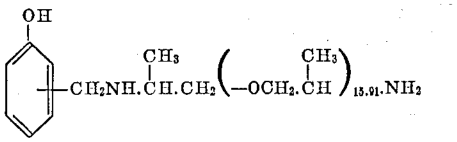

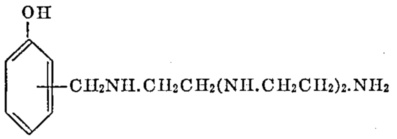

EXAMPLE 5

A procedure corresponding to that described for the manufacture of the condensation product 1 is followed. However 380 g. of polyoxypropylenediamine (molecular weight 190, 2 moles), 188 g. of phenol (2 moles) and 138 g. of a 44 percent strength by weight aqueous formaldehyde solution (2 moles) are employed.

The curing agent has an H.A.V. of 99, a viscosity of 1554 cp. measured in the Höppler viscometer at 25° C., a density of 1.035 (25° C.), an amine number of 372 and a pot life (100 g. of a polyglycidyl ether based on bisphenol A and epichlorhydrin with an epoxide equivalent of 190, mixed with 52 g. of the curing agent) of 70 minutes measured at 22° C.

The condensation product 5 mainly consists of

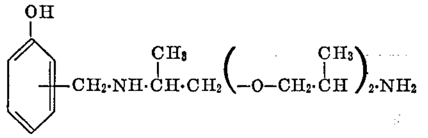

EXAMPLE 6

A procedure corresponding to that described for the manufacture of the condensation product 1 is followed. However, 273 g. of polyoxypropylenediamine (molecular weight 248, 1.1 moles), 103.5 g. of phenol (1.1 moles) and 75 g. of a 44 percent strength by weight aqueous formaldehyde solution (1.1 moles) are employed.

The curing agent has an H.A.V. of 118, a viscosity of 964 cp. measured in the Höppler viscometer at 25° C., a density of 1.02 (25° C.), an amine number of 305 and a pot life (100 g. of a polyglycidyl ether based on bisphenol A and epichlorhydrin, with an epoxide equivalent of 190, mixed with 62 g. of the curing agent) of 140 minutes measured at 22° C.

The condensation product 6 mainly consists of

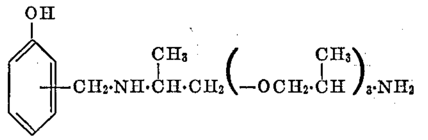

EXAMPLE 7

A procedure corresponding to that described for the manufacture of the condensation product 1 is followed. However, 398 g. of polyoxypropylenediamine (molecular weight 398, 1 mole), 94 g. of phenol (1 mole) and 69 g. of a 44 percent strength by weight of aqueous formaldehyde solution (1 mole) are employed.

The curing agent has an H.A.V. of 165, a viscosity of 555 cp. measured in the Höppler viscometer at 25° C., a density of 1.01 (25° C.), an amine number of 219 and a pot life (100 g. of a polyglycidyl ether based on bisphenol A and epichlorhydrin with an epoxide equivalent of 190, mixed with 87 g. of the curing agent) of 7 hours measured at 22° C.

The condensation product 7 mainly consists of

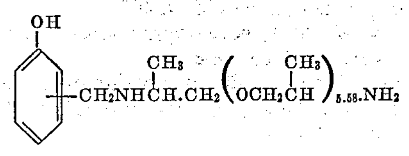

EXAMPLE 8

A procedure corresponding to that described for the manufacture of the condensation product 1 is followed. However, 249 g. of polyoxypropylenediamine (molecular weight 996, 0.25 mole), 94 g. of phenol (1 mole) and 17 g. of a 44 percent strength by weight aqueous formaldehyde solution (0.25 mole) are employed.

The curing agent has an H.A.V. of 458, a viscosity of 781 cp. measured in the Höppler viscometer at 25° C., a density of 1.00 (25° C.), an amine number of 118 and a pot life (100 g. of a polyglycidyl ether based on bisphenol A and epichlorhydrin, with an epoxide equivalent of 190, mixed with 242 g. of the curing agent) of 8 hours measured at 20° C.

The condensation product 8 mainly consists of

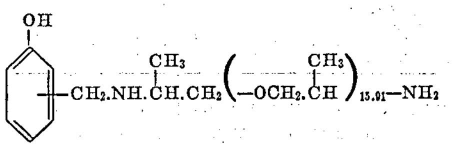

EXAMPLE 9

A procedure corresponding to that described for the manufacture of the condensation product 1 is followed. However, 136 g. of polyoxypropylenediamine (molecular weight 190, 0.72 mole), 136 g. of xylylene diamine (for example an isomer mixture of 70 percent by weight of the 1,3-compound and 30 percent by weight of the 1,4-compound) (1 mole), 161 g. of phenol (1.72 moles) and 82 g. of a 44 percent strength by weight aqueous formaldehyde solution (1.2 moles) are employed.

The curing agent has an H.A.V. of 77.5, a viscosity of 1280 cp. measured in the Höppler viscometer at 25° C., and a pot life (100 g. of a polyglycidyl ether based on bisphenol A and epichlorhydrin with an epoxide equivalent of 190, mixed with 41 g. of the curing agent) of 21 minutes measured at 20° C.

The condensation product 9 consists of a mixture of

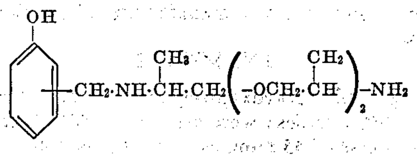

and

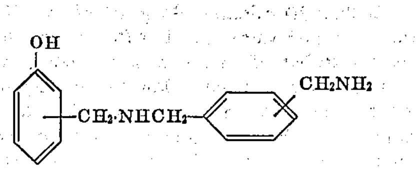

I claim:

1. A substituted phenol having the formula

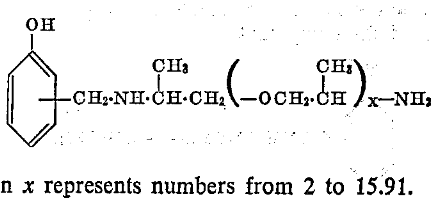

wherein $x$ represents numbers from 2 to 15.91.

2. A substituted phenol having the formula
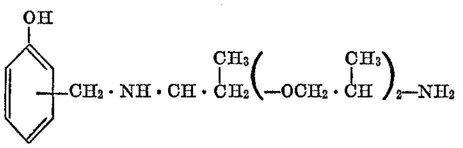
3. A substituted phenol having the formula
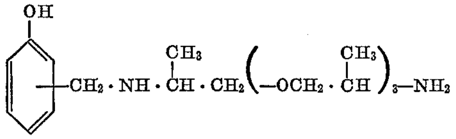
4. A substituted phenol having the formula
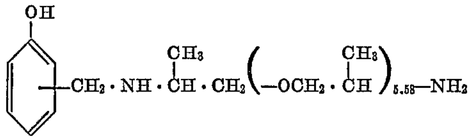
5. A substituted phenol having the formula
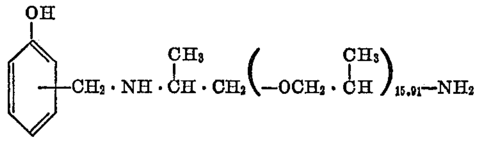
References Cited
UNITED STATES PATENTS
| | | | |
|---|---|---|---|
| 2,033,092 | 3/1936 | Bruson | 260—570.9 X |
| 1,919,301 | 7/1933 | Morton | 260—570.9 UX |
OTHER REFERENCES
Adams et al., "Organic Reactions," vol. 1, pp. 311, 323 and 327–30 (1954).
ROBERT V. HINES, Primary Examiner
U.S. Cl. X.R.
260—9, 28, 47 EN, 55, 59, 570.8 R, 570.9, 584 B, 584 C